United States Patent [19]

Dominique

[11] Patent Number: 4,882,922

[45] Date of Patent: Nov. 28, 1989

[54] ROLLING MILL ROLL WITH ROTATING SHELL

[75] Inventor: Boulot Dominique, Boulogne, France

[73] Assignee: Clecim S. A., Courbevoie Cedex, France

[21] Appl. No.: 55,961

[22] Filed: Jun. 1, 1987

[30] Foreign Application Priority Data

Jun. 4, 1986 [FR] France .................................. 86 08074

[51] Int. Cl.⁴ ........................ B21B 29/00; B21B 37/00
[52] U.S. Cl. ..................................... 72/243; 29/113.2;
     29/116.2; 72/8; 72/10; 72/245; 100/162 B
[58] Field of Search ......................... 72/243, 245, 8–12,
     72/16; 29/113 R, 113 AD, 116 R, 116 AD;
     100/162 B

[56] References Cited

U.S. PATENT DOCUMENTS 3,997,953 12/1976 Christ et al. .................... 29/116 AD
4,328,744 5/1982 Pav et al. ..................... 29/116 AD X
4,498,383 2/1985 Pav et al. ..................... 29/116 AD X

Primary Examiner—Robert L. Spruill
Assistant Examiner—Steven B. Katz

Attorney, Agent, or Firm—Pollock, Vande Sande & Priddy

[57] ABSTRACT

A roll with rotating shell comprising a fixed support beam (2), a tubular shell (1) rotatably mounted on the support beam (2) about an axis, a plurality of shoes for holding the shell distributed side by side along the length of the beam in an axial bearing plane (P), each shoe (3) being slideably mounted radially between the shell (1) and the support beam (2) and connected to an arrangement (21, 33) of regulating thrust and to an arrangement (51, 55) of introducing continuously a lubricant into the gap (52) between the bearing face (31) of the shoe and the internal face (13) of the shell. Each shoe (3) is provided, on the part (36) of its bearing face (31) which is turned upstream with respect to the direction of rotation of the shell (1), with an arrangement (6) of centering by lateral bearing on the internal face (13) of the shell in a radial direction (D) inclined with respect to the bearing plane (P) and under sufficient pressure to cause a transverse shift in the shoe and to create the effect of a wedge at the downstream end of the latter. The invention applies in particular to rolling mills used in the metallurgy industry to produce sheets or sheet metal.

11 Claims, 4 Drawing Sheets

ROLLING MILL ROLL WITH ROTATING SHELL

FIELD OF THE INVENTION

The invention relates to a roll with rotating shell, of the type used for pressing or rolling flat products, but relates more particularly to plants for rolling metallic products subjected to substantial compacting loads.

BACKGROUND OF THE INVENTION

It is already known in the art to use, at first in papermaking and then, more recently, in rolling mills, rolls with a rotating shell comprising a fixed main shaft in the form of an elongated beam, surrounded by a tubular shell rotatably mounted on the beam about bearings defining an axis of rotation perpendicular to the rolling direction, and bearing on the beam via a plurality of holding means distributed side by side along the length of the beam and centered in an axial bearing plane which corresponds to the plane of transmission of the rolling load when the roll is part of a rolling mill. In fact, the tubular shell, which is relatively thin, is deformable, and by selectively actuating the different holding means, the external face of the roll, for example in a rolling mill of the quarto or sexto type, can be given a profile which allows the deflection of the shaft to be compensated and any faults in the evenness of the surface or in the thickness of the product caused in the course of rolling to be corrected. For this purpose, each means of holding the shell consists of a shoe essentially centered in the bearing plane, disposed between the shell and the support beam and slideably mounted on the said support beam in a radial direction essentially extending in the screw-down plane. Each shoe bears on one side of the internal face of the shell, via a cylindrical bearing face essentially of the same diameter, and on the other side on the support beam via a regulable thrust means, generally a hydraulic jack. It is thus possible to regulate the thrust of each shoe individually in the radial direction, in order to give the tubular shell the desired profile. The tubular shell rotates on the bearing faces of the holding shoes, and it is necessary to introduce continuously, between the bearing face of the shoe and the internal face of the shell, a hydraulic fluid capable of forming a lubricating film.

In general, each holding shoe functions analogously to a hydrostatic bearing, and for this purpose is provided, on its bearing face, with a hydrostatic cavity consisting of a recess opening towards the outside and allowing the lubricating fluid to be distributed in the gap between the bearing face of the shoe and the shell.

It has therefore been proposed, in copending patent application Ser. No. 154,253 filed by the present applicant on Dec. 28, 1987, to connect each holding shoe to means of circulating lubricating fluid in the gap between the shoe and the shell and in the direction of rotation of the latter, in such a way that the holding shoe functions analogously to a hydrodynamic bearing.

To reduce the specific bearing pressure of each shoe on the shell, it has already been proposed, for example in U.S. Pat. No. 3,131,625, to increase the bearing surface of the shoe on the internal face of the shell in such a way that the latter covers a substantial angular sector greater than a quadrant, which may be almost as large as 180°. The shell thus bears on the support beam via actual cushions of fluid, which, furthermore, allow it to be kept essentially centered in the plane of compacting.

In this arrangement, which is provided for the paper industry and is consequently for relatively small pressures, this effect of centering the shell on the holding shoes allows the use of centering bearings placed at either end of the shell to be dispensed with, with the shell bearing on the shaft solely via the shoes.

However, in the case of rolling mills used in metallurgy where the roll is used to apply substantial compacting loads on the product or on a working roll, the shell, which is so mounted that it floats on the shoes, tends to be distorted and to be moved by the rotation of the product or of the working roll, and must therefore be held at each end by centering bearings consisting of an external ring integral with the shell and an internal ring centered on the support beam. However, where substantial rolling loads are involved, these bearings absorb some of the load applied, having the effect, on the one hand, of a perturbation in controlling the distortion of the shell and, on the other hand, of local loads distributed through the system.

SUMMARY OF THE INVENTION

The invention therefore relates to an improvement in the functioning of rolls with a deformable shell of this type, by ensuring that the shell is centered on the shoes in an optimum position without introducing any perturbation, even in the case of substantial loads being applied.

In accordance with the invention, each holding shoe is provided, on the part of its bearing face which is turned upstream with respect to the direction of rotation of the shell, with an auxiliary means of thrust against the internal face of the shell in a radial direction inclined upstream with respect to the screw-down plane and under sufficient pressure to cause, during service, a slight angular shift in the shoe which is capable of bringing about, by a wedge effect, the relative centering of the shell with respect to the shoe.

The invention is particularly advantageously applied to rolling mills, for example of the quarto or sexto type, in which a roll, in general a bearing roll, is of the type which has just been described, comprising a deformable tubular shell rotatably mounted about a support beam and carried at each end by two support chocks which are mounted in two vertical columns of the rolling mill housing, and on which the rolling load is applied, the shell being held by two centering bearings placed at each of its ends.

In accordance with the invention, the internal ring of each centering bearing of the shell bears axially on the corresponding support chock and is locked in rotation with respect to the latter by a pin placed in the screw-down plane on the side diametrically opposite the holding shoes, the shell being centered in the screw-down plane, on the one hand by the said pins and, on the other hand, by all the holding shoes, each shoe covering an angular sector of at least a quadrant and comprising, on the part of its bearing face rotated upstream with regard to the direction of rotation of the shell, an auxiliary means of thrust against the internal face of the shell in a radial direction inclined upstream with respect to the screw-down plane and being under sufficient pressure to cause, during service, a slight angular shift in the shoe which is capable of bringing about, by a wedge effect, a relative centering of the shell with respect to the shoe.

Advantageously, the means of lateral thrust of each shoe comprises at least one hydrostatic centering cavity recessed in the side upstream of the bearing face of the shoe and opening towards the internal face of the shell, and a circuit supplying the centering cavity with a pressurized lubricating fluid capable of constituting at least part of the fluid disposed in the gap between the shoe and the shell.

According to different embodiments of the invention, the lateral centering cavity can also be connected either to means for circulating the lubricating fluid between the shoe and the shell in the case of a hydrodynamic bearing, or else to a load cavity essentially centered in the bearing plane, in the case of a hydrostatic bearing. In the latter case, the centering cavity is fed under a pressure lower than that of the load cavity, the pressure in the centering cavity, for example, possibly being between one third and one half of the pressure in the load cavity.

When the centering cavity is connected to a hydrostatic load cavity, the lubricating fluid is fed via the two cavities at a leak rate sufficiently great to cause a circulation in the direction of rotation of the shell, and consequently the centering of the latter by a wedge effect at the downstream end of the shoe, which then functions hydrostatically with a hydrodynamic centering effect.

Where the shoe functions hydrodynamically, the lateral cavity according to the invention enables the centering effect to be controlled by an oil wedge at the downstream end of the shoe.

In a rolling mill consisting of a roll with a deformable shell according to the invention, each end of the support beam is inserted without play into a sleeve fixed inside the corresponding support chock, onto which sleeve the support beam is locked in rotation. In addition, the internal ring of each centering bearing is, preferably, fixed simply by friction to the sleeve of the corresponding chock via a friction ring applied to the front face of the internal ring by means of a series of hydraulic thrusters distributed over the periphery of the sleeve.

Particularly advantageously, the internal ring of each centering bearing and the corresponding end of the support beam are locked in rotation by the same pin engaging in grooves which are in a straight line along the screw-down plane, and which are recessed respectively in the bushing, the internal ring and the support beam. Sufficient play is then left between the pin and the base of the groove of the internal ring to allow the tubular shell to be positioned with respect to the chocks in use, with the internal ring sliding on the friction ring.

BRIEF DESCRIPTION OF THE DRAWING

The invention will be better understood by the detailed description of one particular embodiment given by way of example and represented in the attached drawings.

DESCRIPTION OF PREFERRED EMBODIMENT

Figure 1:
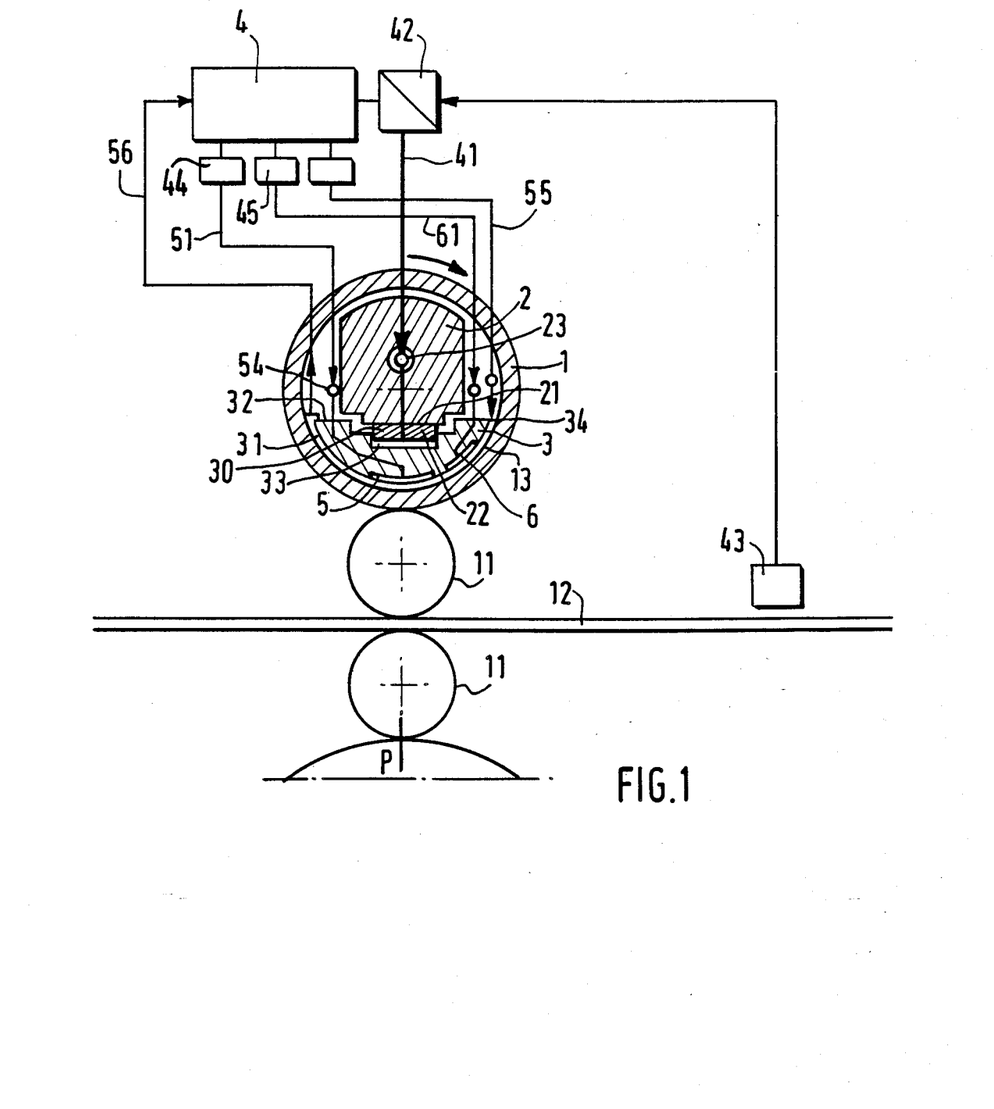
FIG. 1 is a front elevation of a roll with a rotating shell, provided with centering means according to the invention.

FIG. 1 shows a schematic representation in cross-section of a bearing roll of a rolling mill 1 connected to two working rolls 11, between which the rolled product 12 passes.

According to an arrangement which is now well known, the bearing roll consists of a tubular shell 1 which is rotatably mounted about a support beam 2 extending inside the tubular shell 1 transversely to the direction of rolling, and defining an axis of rotation of the tubular shell placed in the plane of rolling P passing through the axes of the working rolls 11.

The tubular shell 1 bears on the beam 2 via a plurality of holding shoes 3 distributed along its entire length and disposed between the cylindrical internal face 13 of the shell and the lower face 21 of the support beam 2.

For this purpose, each holding shoe 3 bears, on one side, on the tubular shell via a cylindrical bearing face 31 of diameter slightly less than that of the internal face 13 of the shell and, on the other side, on the beam 2, via a hydraulic jack 30 centered in the bearing plane P and comprising a chamber 33 recessed into the body of the shoe 3 and into which can slide a piston 22 integral with the beam 2, or simply bearing on the latter, as will be seen later. The chamber 33 of the jack 30 is fed with oil from a hydraulic station 4 via a supply circuit 41 which, for example, passes through a central orifice 23 in the beam 2 and goes through the latter and the piston 22 to come out in the chamber 33. Each shoe 3 can thus be connected to a separate circuit 41, of which the rate of flow and pressure are controlled by a regulating device 42, by means of data transmitted by a device 43 controlling the evenness of the surface of the rolled product 12, and which can be of any known type.

Numerous installations of this type have already been constructed and described in published documents, and it is therefore not necessary to describe them in detail.

In particular, it is known that, according to the data given by the control device 43, the regulating device 42 regulates the pressure in the jacks 33 of each of the holding shoes 3 so that the tubular shell 1 is given a suitable external profile capable, in particular, of compensating the distortions in beam 2 under the action of the applied loads.

In order to transmit the thrust of the jack 33 to the shell 1, a film of lubricating fluid must be disposed between the bearing face 31 of the shoe 3 and the internal face 13 of the shell, and various means may be used to this effect.

Figure 2:
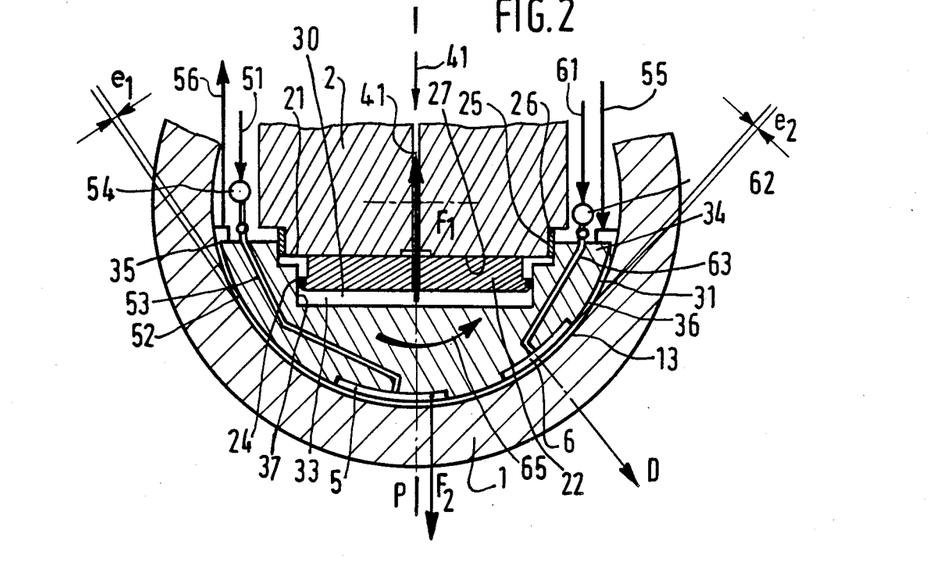
FIG. 2 represents, on an enlarged scale and in cross-section, a holding shoe provided with arrangements according to the invention.

For example, as more clearly shown in FIG. 2, the shoe 3 can be provided in its central part with a hydrostatic cavity 5 consisting of a recess in the bearing face 31 which opens widely towards the outside and is connected to the hydraulic station 4 by a supply circuit 51 enabling lubricating fluid to be introduced into the cavity 5 under a pressure corresponding to the thrust of the jack 22, 33, with leak flow which is sufficient for the oil to be distributed between the internal face 13 of the shell 2 and the bearing face 31 of the shoe 3, forming a continuous film of oil 52 which allows the shell 1 to rotate while bearing on the shoe 3.

The supply pressure of the load cavities 5 of the shoes 3 can be the same for all the shoes, where each of the latter can be provided with a supply conduit 53 from the load cavity 5 connected to a distribution conduit 54 extending along the beam 2 for supplying all the shoes, and fed by the circuit 51 from the hydraulic station 4 via a device 44 controlling the pressure.

It is also possible, as was described in the above-cited patent application Ser. No. 154,253, to connect the shoes 3 to means for circulating oil in the space between the shoes and the shell, comprising a feeding circuit 55 which introduces the lubricating fluid at the end 34 of the shoe 3 turned upstream with respect to the direction of rotation of the shell, the fluid thus injected being shifted by the rotation of the shell 1 about the shoe 3 up to the downstream end 35, where there is a device for collecting the oil which sends the collected oil, via a return circuit 56, back to the hydraulic station 4.

Thus, according to the patent application cited above, a hydrodynamic lift effect may be added to the hydrostatic effect brought about by the load cavity 5, but, in certain cases, it is also possible to use only the hydrodynamic device.

According to a feature of the invention, on the part 36 of the bearing face 31 of the shoe turned upstream with respect to the direction of rotation, there is arranged a lateral hydrostatic cavity 6 which is fed with oil by the hydraulic station 4 via a supply circuit 61 common to all the shoes and opening out into a distribution conduit 62 connected to the different lateral cavities 6 via ducts 63 recessed in each of the shoes.

The supply circuit 61 of the lateral cavities 6 is provided with a means 45 for controlling the flow and the pressure of the oil.

It is thus possible, by supplying the cavities 6 under a sufficient pressure directed in direction D, inclined with repsect to the bearing plane P, to bring about a slight angular shift in the shoe 3 with respect to the beam 2 in the direction of the arrow 65 indicated in FIG. 2, i.e., downstream with respect to the shoe. The play $e_1$ between the downstream end 35 of the shoe and the internal wall 13 of the shell then decreases as the play $e_2$ at the upstream end 34 of the shoe 3 increases. An oil wedge is thus created at the downstream end 35 of the shoe, which brings about an automatic centering effect on the shell 1 with respect to the shoe 3 which bears on the beam 2 via the jack 30.

Figure 3:
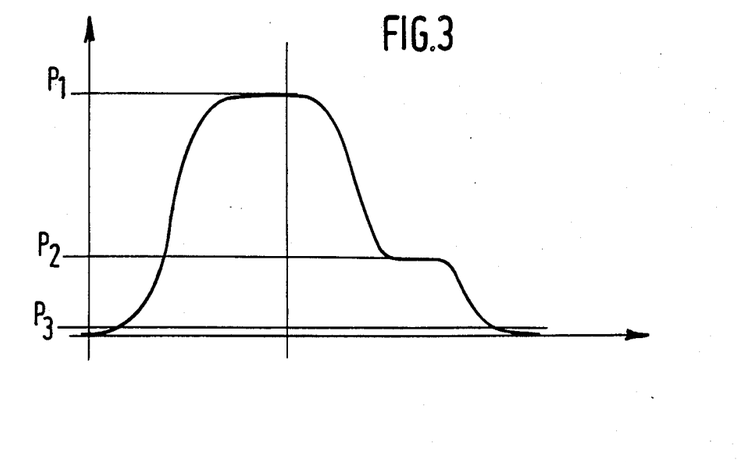
FIG. 3 is a graph of the pressures exerted along the shoe according to the invention.

It is thus possible to define a minimum play $e_o$, for example 50 microns, and to determine the pressures in the load cavity 5 and in the centering cavity 6 as a function of the minimum play, the rotation speed of the shell which is generally predetermined, the temperature rise, the load to be transmitted to the shell and, generally, of all the parameters acting on the circulation of oil in order that the play is maintained by automatic regulation to the desired value. In fact, as has been shown schematically by way of example in FIG. 3, which shows the distribution of pressures along the bearing face 31 of the shoe, the pressure $P_2$ in the centering cavity 6 can be determined to correspond with the pressure $P_1$ in the load cavity 5, taking into account the position of the cavities so that there is an equilibrium between the various pressures exerted in the central plane P of the shoe. Thus, if the play $e_1$ decreases, an increase in pressure is produced downstream which pushes the shoe 3 back into its central position, and vice versa.

As a result of the centering cavity according to the invention, it is thus possible to produce the oil wedge necessary for the hydrodynamic automatic centering of the shoe without giving the bearing face of the latter the profile normally necessary to produce the oil wedge, as in the case of hydrodynamic bearings, and this happens even when the relative speeds of the shell and the shoes are low.

It will be seen that, as shown in the figure, the load cavity 5 is not precisely centered in the bearing plane P, but is preferably slightly shifted in the downstream direction so that the centering of each shoe with respect to the shell takes into consideration the combined effects of the two cavities 5 and 6.

The oil is introduced into these cavities 5 and 6 at a constant rate, and thus at a pressure in the cavity which varies as a function of the position of the shoe, resulting in a leak flow of oil which mixes with the oil in circulation between the shoe and the shell, all the oil being collected by the circuit 56.

Advantageously, the piston 22 bears on the lateral wall of the chamber 33 of the jack 30 via a sealing joint 24 arranged so that it constitutes a bearing allowing a slight pivoting of the shoe 3, with respect to the piston 22, about an axis parallel to that of the shell 1. In addition, the latter preferably consists of a separate plate which bears slideably on the lower face 21 of the beam 2, the latter constituting a single smooth flat face perpendicular to the bearing plane P.

Before the pressure is applied, the shoes 3 are held in place with respect to the support beam 2 by sliding along guide faces parallel to the plane of compacting P and provided with packing 25 which allows a certain play, for example 1 mm, for the relative positioning of the piston 22, the shoe 3 and the shell. When the rolling mill is started up, the various elements can thus position themselves freely with respect to each other, the piston 22 of each shoe being capable of sliding lightly on the smooth bearing face 21 of the beam 2 while the pressure is still low. On the other hand, as soon as the pressure in the jacks 30 increases, the piston 22 is locked by friction with respect to the beam 2 and constitutes a fixed lateral bearing for the shoe 3, which can however pivot slightly about the axis as a function of the pressures applied to the shell 1 along the bearing face 31.

As a result of this arrangement, when the system is started up, the shell and all the shoes can position themselves with respect to each other as a function of the loads applied, so that when the jacks are put under pressure, a relative automatic centering of the shell and the shoes is obtained, each shoe assuming a stable position when the resultants $F_2$ of the loads in the film of oil and $F_1$ of the loads in the hydraulic chamber 33 are equal and opposing.

However, the overall resultant of the loads in operation does not necessarily pass through the center of the shaft, which is thus under a torque which tends to turn it. On the other hand, the shell needs a point of bearing in the plane of compacting on the side opposite the shoe.

Figure 4:
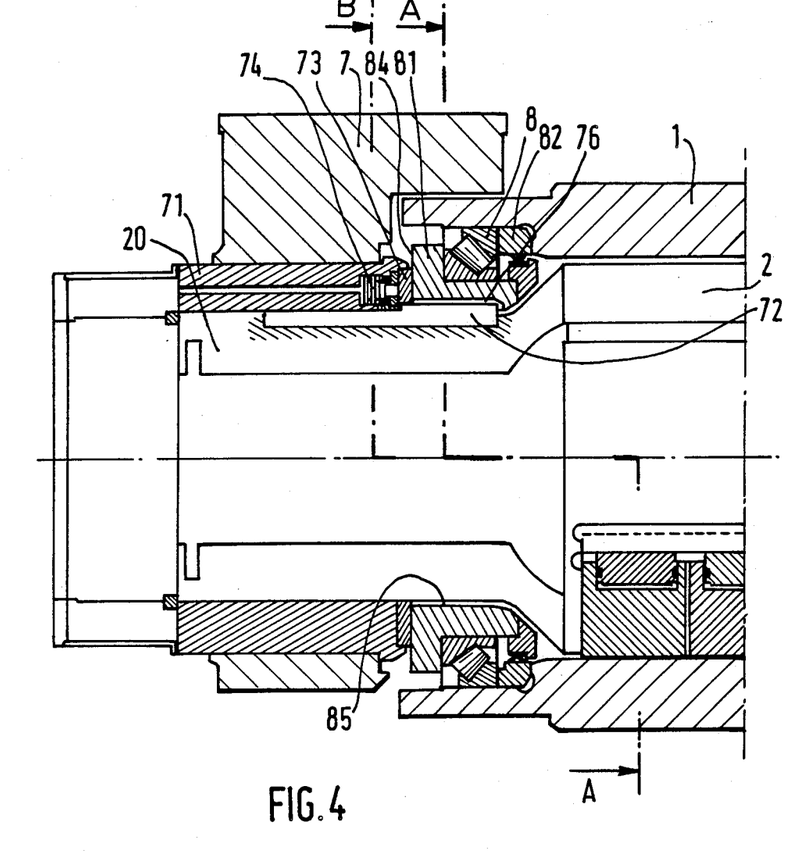
FIG. 4 represents, on an enlarged scale, the end of a rolling mill roll with a deformable shell.
Figure 5:
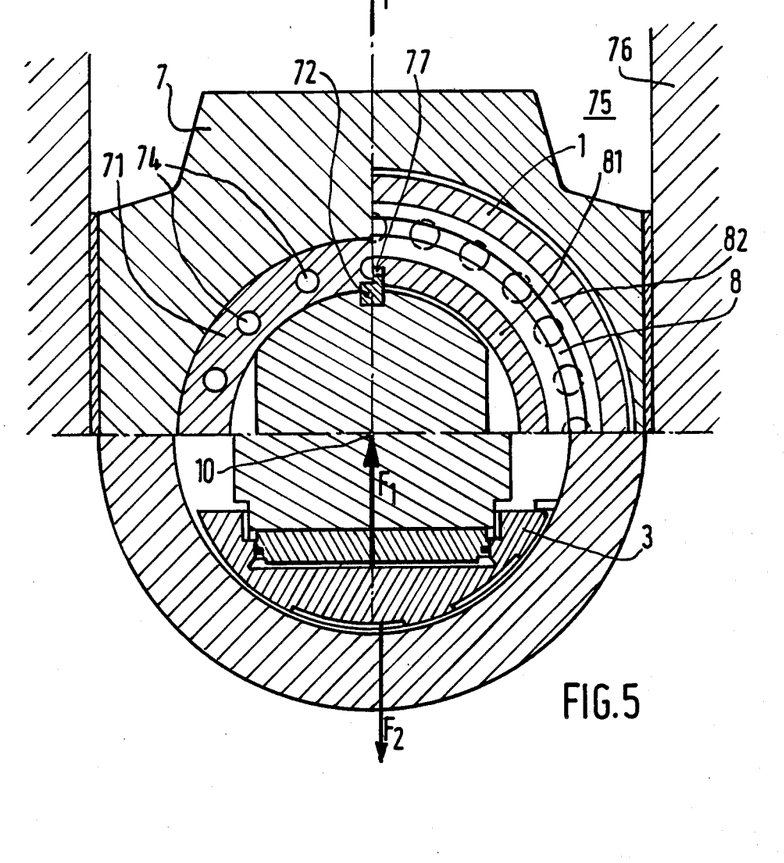
FIG. 5 is a cross-sectional view on the right along the line A—A and on the left along the line B-A of FIG. 4.

For this reason, according to a particularly advantageous arrangement shown in FIGS. 4 and 5, that the centering bearings 8 of the shell are each guided with respect to the chocks 7 by means of a pin 72 which also serves to lock them in rotation with the support beam 2.

In fact, as shown in detail in FIG. 4, each end 20 of the support beam 2 is inserted without play into a sleeve 71 fixed to the chock 7 which is slideably mounted, in a conventional manner, in the direction of compacting in a window 75 of the corresponding column 76 of the rolling mill.

The tubular shell 1 is provided at each end with a centering bearing 8 which comprises an internal ring 81 and an external ring 82, between which are placed conical rolling bearings enabling bearing 8 to act as a thrust bearing to enclose the axial thrusts applied to the shell.

When the external ring 82 rotates integrally with the shell 1, the internal ring 81 surrounds the end 20 of the support beam 2 with sufficient play to allow the tubular shell 1 to be positioned freely with respect to the support beam 2, under the action of the loads applied, and to take account of the thickness of the rolled product. In fact, the internal ring 81 bears directly on the sleeve 71 of the chock 7 via a friction ring 73 which is applied under pressure to the front face 84 of the internal ring 81 by means of a series of hydraulic thrusters 74 distributed over the entire periphery of the sleeve 71 and each consisting of a jack supplied with pressurized oil.

Thus, the shell 1 and the beam 2 can be deformed independently of one another about the two centering points constituted at each end by the single pin 72. The latter, which is centered in the screw-down plane of compacting P and placed diametrically opposite the shoe 3, engages in three grooves which are in a straight line and are respectively recessed in the sleeve 71, in the end 20 of the beam 2 and in the internal ring 81 of the bearing 8.

The ring 81 is thus integral with the bushing 71 solely by friction via the friction ring 73. When the support beam 2 deflects under the action of the compacting load, the chocks 7, into which these ends 20 are inserted without play, can undergo slight angular shifts between the guide faces of the columns 76, the axis of the sleeve 71, which corresponds to that of the end 20 of the beam 2, no longer being strictly perpendicular to the rolling load. However, under the action of the loads applied and the changes in temperature, the tubular shell 1 is positioned and slightly deformed such that the plane of the front face 84 of the bearing 8 also shifts with respect to the direction of the clamping load, but this shift is independent of that of the axis of the sleeve 71, caused by the deflection of the beam 2, the two deformations being independent of one another because of the play existing between the circular face 85 of the ring 81 and the wall of the end 20 of the beam 2, the same play 77 being left between the pin 72 and the base of the corresponding groove 78 in the ring 71.

The angular shift between the friction ring 73, which remains against the ring 80, and the end of the bushing 71 is absorbed by all the thrusters 74.

In the same way, when the system is started up, the internal ring 81 can slide slightly on the friction ring 73 to allow the shell to be positioned, the bearings 8 then being locked by friction by the thrusters 74.

Taken as a whole, the arrangements which have just been described thus ensure, on the one hand, the free positioning of the different elements with respect to one another and then, in the course of rolling, the automatic centering of the shell 1 with respect to the holding shoes by the equilibrium of the pressures applied in the oil film and in the chamber of the thrusting jack by taking directly a fixed reference on the chocks 7 via the two centering pins 72.

A stable hydromechanical system is thus obtained, each shoe positioning itself freely for operation by the automatic regulation of the oil film.

A roll has been described with holding shoes using a combined hydrostatic and hydrodynamic bearing means, but the centering cavity according to the invention could also be used with holding shoes using either only a hydrostatic or only a hydrodynamic effect.

As has been indicated, when the shoe bears on the shell only by the hydrodynamic effect, the use of the centering cavity according to the invention favors the effect of automatic centering of the shoe even without giving a particular shape to the bearing face 31 of the latter.

When the holding shoe 3 is provided solely with a hydrostatic load cavity 5, the use of the centering pocket 6 brings about an automatic centering by the effect of a wedge at the downstream end, the circulation of oil in the gap between the shoe and the shell then being ensured by the leak flow of the load cavity 5 and the centering cavity 6, even in the absence of the supply circuit 55.

In addition, the invention has been described within the scope of a bearing roll for a rolling mill, which is a particularly advantageous application thereof, but the same arrangements could be useful for other applications in any case where a roll with a rotating shell bearing on a support beam via holding shoes distributed along its length is used.

I claim:

1. A rolling mill for rolling metal products with rolls mounted in a roll stand structure to transmit a rolling load, comprising at least roll with a deformable rotating shell, said roll comprising a fixed support (2) in the form of an elongated beam, a tubular shell (1) surrounding the support beam (2) and rotatably mounted about an axis, a plurality of means (3) for holding the shell, these means being distributed side by side along the length of the beam and in a screw-down plane (P) along which the rolling load is transmitted, each holding means comprising a shoe (3), essentially centered in the bearing plane (P), disposed between the shell (1) and the support beam (2) and slidably mounted on said support beam in a radial direction, essentially in the screw-down plane (P), and a means (30) for regulating the radial thrust of the shoe (3), which thrust bears on the shoe and on the beam, the shoe (3) being provided with a cylindrical bearing face (31) having a radius essentially equal to that of the internal face (13) of the shell (1) and connected to means (51, 55) for introducing continuously, in the direction of rotation of the shell, a lubricating fluid in the form of a film disposed in the gap (52) between the bearing face (31) of the shoe and the internal face (13) of the shell, wherein each shoe (3) is provided, on the part (36) of its bearing face (31) which is turned upstream with respect to the direction of rotation of the shell (1), with an auxiliary means (6) of lateral thrust against the internal face (13) of the shell in a radial direction (D) inclined upstream with respect to the screw-down plane (P) and under sufficient pressure to cause, during service, a slight angular shift in the shoe which is capable of bringing about, by a wedge effect, the relative centering of the shell (1) with respect to the shoe (3).

2. A rolling mill for rolling metal products with rolls mounted in a roll stand structure to transmit a rolling load, comprising a least one roll with rotating shell, comprising, inside a housing (76), at least two rolls rotatably mounted about parallel axes and placed in a screw-down plane (P), each being on two chocks (7) mounted in uprights (76) of the housing, said roll comprising a tubular shell rotatably mounted about a support beam (2) extending along the axis (10) of rotation between the two support chocks (7), one at each end (20) of the beam (2), a plurality of shoes (3) regulating the profile of the shell (1), distributed along the entire length of the shell (1) and centered in the plane (P) of transmission of the load, each shoe bearing in the direction of the rolling load, on the one hand, on the internal face (13) of the tubular shell (1) via a cylindrical bearing face (31) and, on the other hand, on a bearing face (21) recessed in the support beam (2) perpendicular to the screw-down plane (P), via a jack (30) fed with pressurized fluid for regulating the thrust of the shoe, the shell (1) being provided at each end with a centering bearing (8) comprising an external ring (82) which is in integral rotation with the shell and an internal ring (81) in fixed rotation, wherein the internal ring (81) of each centering bearing (8) bears axially on the corresponding support chock (7) and is locked in rotation with respect to the latter by a pin (72) centered in the plane (P) of rolling and placed diametrically opposite the regulating shoes (3), and wherein the shell is centered in the screw-down plane by said pins (72) and by all the regulating shoes (3), each shoe (3) covering an angular sector of at least a quadrant and comprising, on the part of its bearing face (31) turned upstream with regard to the direction of rotation of the shell (1), an auxiliary means (6) of thrust against the internal face (13) of the shell (1) in a radial direction (D) inclined upstream with respect to the plane (P) of rolling and being under sufficient pressure to cause, during service, a slight angular shift in the shoe (3) which causes, by a wedge effect, relative centering of the shell (1) with respect to the shoe (3).

3. A rolling mill as claimed in claim 1 or 2, wherein the means of lateral thrust of each shoe (3) comprises at least one hydrostatic centering cavity (6), recessed in the side upstream (36) of the bearing face (31) of the shoe (3) and opening towards the internal face (13) of the shell (1), and a separate circuit (61) supplying the cavity (6) with a pressurized lubricating fluid capable of constituting at least part of the fluid disposed in the gap (52) between the shoe (3) and the shell (1).

4. A rolling mill as claimed in claim 3, wherein each shoe (3) is connected to means (5) for circulating a lubricating fluid in the gap (52) between the shoe (3) and the shell (1) in the direction of rotation of the shell and wherein the centering cavity (6) is fed by lubricating fluid capable of mixing with the circulating fluid.

5. A rolling mill as claimed in claim 3, wherein each shoe (3) is provided with at least two hydrostatic bearing cavities, respectively one lateral centering cavity (6) and at least one load cavity (5) essentially centered in the bearing plane (P), said cavities being fed with lubricating fluid under different pressures, the centering cavity being under a pressure different from the pressure in the load cavity, and the lubricating fluid being fed via the two cavities at a leak rate sufficiently great to cause a circulation of fluid in the direction of rotation of the shell.

6. A rolling mill as claimed in claim 1 or 2, wherein each jack (30) for regulating the thrust of the shoe comprises a chamber (33) recessed into the body of the shoe (3) and formed by a piston (22) consisting of a plate bearing slideably on the flat face (21) of the support beam (2) and provided on its periphery with a sealing joint (24) sliding pivotably along the lateral wall (37) delimiting the chamber (33), enabling a slight angular shifting of the shoe (3) with respect to the piston (22) to take place.

7. A rolling mill as claimed in claim 6, wherein each shoe (3) is mounted slideably radially on the support beam (2) with a play enabling a slight angular shifting of the shoe (3).

8. A rolling mill as claimed in claim 2, wherein each end (20) of the support beam (2) is inserted without play into a sleeve (71) fixed inside the corresponding support chock (7), and onto which the end (20) of the support beam is locked in rotation.

9. A rolling mill as claimed in claim 8, wherein the internal ring (81) of each bearing (8) centering the shell is fixed simply by friction to the sleeve (71) of the corresponding chock via a friction ring (73) applied to the front face (82) of the internal ring (81) by means of a series of hydraulic thrusters (74) distributed over the periphery of the sleeve (71).

10. A rolling mill as claimed in claim 8, wherein the internal ring (81) of each centering bearing (8) and the corresponding end (20) of the support beam (2) are locked in rotation by a single pin (72) engaging in grooves which are in a straight line along the plane (P) of compacting, and which are recessed respectively in the bushing (71), the internal ring (81) and the support beam (2).

11. A rolling mill as claimed in claim 10, wherein the base of the groove (83) of the internal ring (81) in which the pin (72) engages is separated from the latter by a play which is sufficient to allow the tubular shell (1) to be positioned with respect to the chocks (8) in use, the internal ring (81) sliding on the friction ring (74).

* * * * *

UNITED STATES PATENT AND TRADEMARK OFFICE
CERTIFICATE OF CORRECTION

PATENT NO. : 4,882,922
DATED : NOVEMBER 28, 1989
INVENTOR(S) : Dominique BOULOT

It is certified that error appears in the above-identified patent and that said Letters Patent is hereby corrected as shown below:

TITLE PAGE: Item [75]
The inventor's names have been reversed, and should be corrected as follows:

--Dominique BOULOT--

COLUMN 8, line 25;
The word "one" has been omitted in claim 1, line 3.

Signed and Sealed this

Twenty-eighth Day of April, 1992

*Attest:*

HARRY F. MANBECK, JR.

*Attesting Officer*     *Commissioner of Patents and Trademarks*